United States Patent [19]

Häberle et al.

[11] Patent Number: 5,169,189
[45] Date of Patent: Dec. 8, 1992

[54] DEVICE FOR HOLDING A DECORATIVE COVER ON A BUMPER

[75] Inventors: Fritz Häberle, Sindelfingen; Horst Kleiner, Stuttgart; Josef Oravetz, Sindelfingen, all of Fed. Rep. of Germany

[73] Assignee: Mercedes-Benz, Fed. Rep. of Germany

[21] Appl. No.: 794,521

[22] Filed: Nov. 19, 1991

[30] Foreign Application Priority Data

Nov. 27, 1990 [DE] Fed. Rep. of Germany ....... 4037706

[51] Int. Cl.$^5$ ............................................. B60R 19/02
[52] U.S. Cl. ................................... 293/102; 293/120; 411/85; 411/104; 52/716.6; 428/31
[58] Field of Search ................................ 293/120-122, 293/128, 154, 155, 102; 52/717.1, 718.1; 411/84, 85, 104; 428/31; 24/293-295

[56] References Cited

U.S. PATENT DOCUMENTS

| | | | |
|---|---|---|---|
| 2,596,780 | 5/1952 | Meyers et al. | 293/121 X |
| 2,798,756 | 7/1957 | Corydon | 293/155 X |
| 2,879,569 | 3/1959 | Poupitch | 52/718.1 X |
| 3,591,996 | 7/1971 | Shanok et al. | 428/31 X |
| 3,605,231 | 9/1971 | Kistner et al. | 428/31 X |
| 4,011,635 | 3/1977 | Meyer | 24/293 |
| 4,709,525 | 12/1987 | Adell | 428/31 X |

FOREIGN PATENT DOCUMENTS

| | | |
|---|---|---|
| 2049241 | 4/1972 | Fed. Rep. of Germany ..... 52/717.1 |
| 7528107 | 9/1975 | Fed. Rep. of Germany . |
| 2848257 | 5/1979 | Fed. Rep. of Germany . |
| 3429451 | 2/1986 | Fed. Rep. of Germany . |

*Primary Examiner*—Dennis H. Pedder
*Attorney, Agent, or Firm*—Evenson, Wands, Edwards, Lenahan & McKeown

[57] ABSTRACT

A device is disclosed for holding a decorative cover on a bumper. Known holding devices provide either attachment of the decorative cover to the bumper in a manner fixed by means of a fastening clip or screw fastenings which are passed through an elongate hole in the bumper, the intention of this being that the elastic bumper should be movable relative to the decorative cover. The new device for holding a decorative cover includes a holding clip and a fixing pin, the decorative cover merely requiring to be pushed on rather than attaching by screw threads. The elongate hole is made in the holding clip. The pin is inserted with an accurate fit into the bumper and can be moved along the elongate hole relative to the holding clip and the decorative cover.

9 Claims, 2 Drawing Sheets

DEVICE FOR HOLDING A DECORATIVE COVER ON A BUMPER

BACKGROUND AND SUMMARY OF THE INVENTION

The invention relates to a device for holding a decorative cover on a bumper of a vehicle.

From German Utility Model 7,528,107 it is known to fix a protective strip resiliently on a support by means of a fastening clip, which strip extends, for example, transversely across the front side of a body and partially covers a bumper situated below it. For this purpose, the support is provided with bolts, into which the fastening clip can be snapped. This is effected by the fastening clip being snapped in resiliently and secured in this fixed position against sliding out by means of a securing lug. Relative mobility of the fastening clip in relation to the bolts of the support is not provided there.

German Patent Document DE 34 29 451 A1 discloses a decorative strip fixing on a bumper of a motor vehicle which is intended, in the region of the middle of the vehicle, to make possible a displacement of the decorative strip in relation to the bumper in the longitudinal direction of the vehicle and a displacement in the transverse direction of the vehicle in the outer regions in order to avoid damage to the decorative strip when the bumper is stressed within its elastic range. For this purpose, the bumper is provided with corresponding elongate holes in the longitudinal and transverse direction and the decorative strip is fixed on the bumper via a screw fastening passed through the respective elongate hole.

A screw fastening, likewise extending through elongate holes in the bumper, for holding a decorative body is disclosed in German Patent Document DE 28 48 257 A1. The arrangement there envisages that, in the event of impact loading, the decorative body yields to the impact force together with the bumper in the central region whereas, in the outer regions, due to the elastically yielding bumper and the dimensionally stable decorative body, a relative movement of the two parts takes place such that the decorative body is pressed away relative to the bumper in the direction of the vehicle body, counter to the force of a counterspring. It is thus over its entire length that the decorative strip follows the movement of the bumper, the latter occurring only in the central region of the said bumper.

It is an object of the invention to provide a holding device with which the decorative cover can be fixed on the bumper in a simple manner, in particular without requiring screw fastenings, in such a way that the bumper can move relative to the decorative cover within its elastic range.

This object is achieved, for a device of the type stated at the outset for holding a decorative cover, by providing a device for holding a decorative cover on a bumper of a vehicle, which comprises a holding clip and a fixing pin, wherein the holding clip has an elongate hole, wherein the fixing pin is held movably in the elongate hole of the holding clip by a head at a pin end, and wherein said fixing pin extends through an accurately fitting opening extending essentially perpendicular to the elongate hole in the bumper. The fixing pin fixed in the accurately fitting opening of the bumper can move within the elongate hole of the holding clip onto which the decorative cover can be clipped. When the bumper yields elastically to an impact force, the motion pin is displaced in the elongate hole of the holding clip, with the result that no permanent deformation of the flexurally more rigid decorative cover occurs. It is thus possible to achieve a holding device for a decorative cover, which holding device permits a yielding motion of the bumper, without expensive screw fastenings. Compared to screw fastenings which can be moved in an elongate hole in the bumper and are passed through the latter, the solution according to the invention has the further advantage that wear phenomena, which principally affect the rim of the elongate hole, occur on a small component, i.e. the holding clip, which is easy and inexpensive to replace. If a yielding motion of the bumper beyond the range provided by the elongate hole occurs, permanent deformations thereby occurring on the bumper, there is furthermore the advantage that, initially, only the holding clip is deformed thereby, with the result that, even then, no permanent deformation of the decorative cover may occur.

In a further development of the invention, the fixing pin is secured at its end facing away from the holding clip by a spring clamping element. As a result, the head of the fixing pin is pressed resiliently against the rim of the elongate hole, as a result of which the yielding motion can take place without play and hence with relatively little wear.

A preferred embodiment of the invention provides that the holding clip has a web which extends in an approximately plane-parallel fashion above the elongate hole, said web at least partially covering the elongate hole and, together with a base surface of the holding clip which contains the elongate hole, forms a motion slot for the head of the fixing pin. This arrangement makes possible reliable guidance of the head of the motion pin during a yielding motion of the bumper. At the same time, the web overlapping the head prevents the motion pin coming away from the holding clip in the installation position of the pin. The web advantageously overlaps the elongate hole to just such an extent that the motion pin can only be introduced into or removed from the clip in a certain position.

In a further embodiment of the invention, the spring prongs of the holding clip press the decorative cover against the bumper, in each case in the vicinity of the narrow sides of the cover. Holding the decorative cover in this way prevents the formation of a gap caused by bending up at the edges, through which gap dirt and/or salt water would get into the cavity of the decorative cover, and simultaneously forms a clamped connection of the decorative cover to the bumper which has a high retention force.

Other objects, advantages and novel features of the present invention will become apparent from the following detailed description of the invention when considered in conjunction with the accompanying drawings.

DETAILED DESCRIPTION OF THE DRAWINGS

Figure 1:
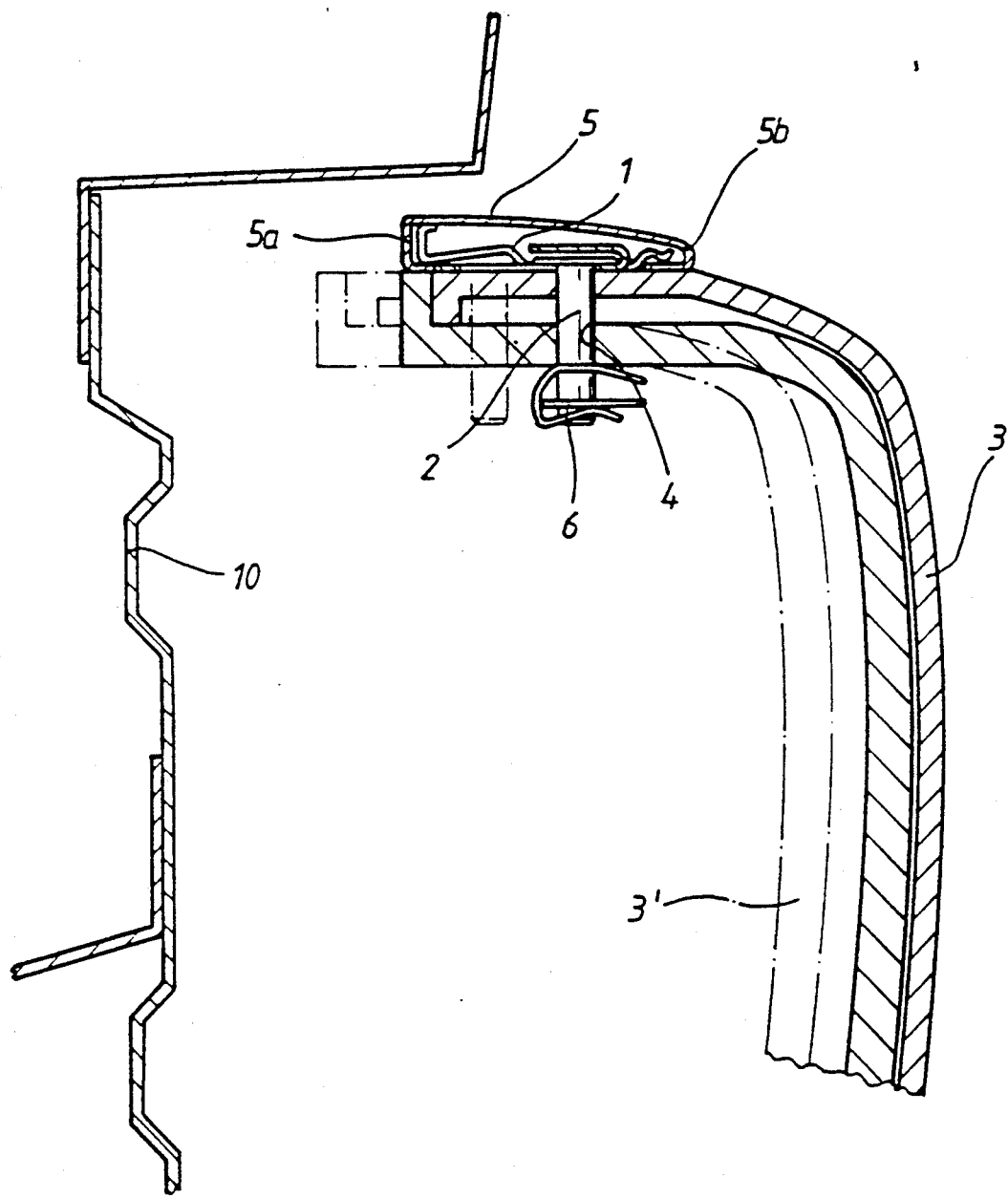
FIG. 1 shows a schematic representation of a bumper arrangement with a decorative cover on the rear end of a vehicle constructed in accordance with a preferred embodiment of the invention.

In FIG. 1, the upper part of a cross-section through a bumper arrangement of a motor vehicle is depicted schematically. The bumper arrangement essentially comprises the bumper (3) itself and a decorative cover (5) arranged on the upper side of the bumper (3). The bumper arrangement is attached in a manner not shown in greater detail, facing away from the vehicle body and adjoining a rear panel (10). The decorative cover (5) is held on the bumper (3) by means of a device which is depicted in greater detail in FIGS. 2 and 3.

Figure 2:
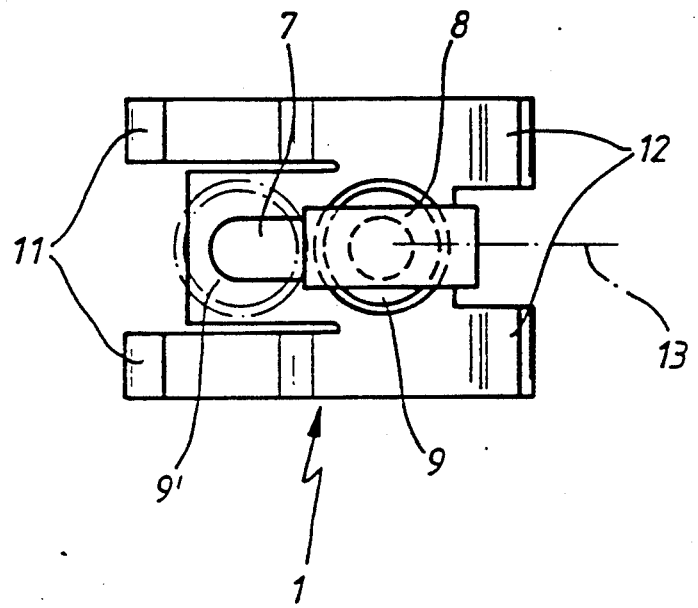
FIG. 2 shows a plan view of a holding clip with an inserted fixing pin for holding the decorative cover in the manner shown in FIG. 1.
Figure 3:
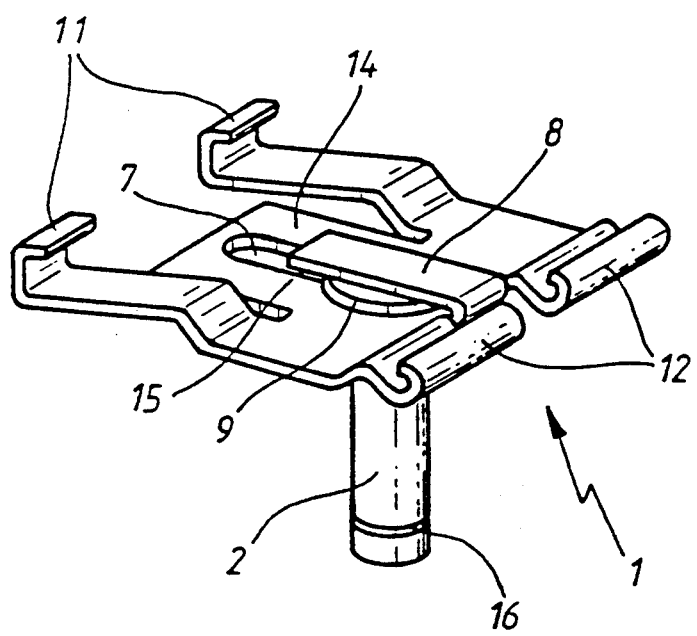
FIG. 3 shows a perspective view of the holding clip with the inserted fixing pin.

As can be seen from FIGS. 2 and 3, the holding device comprises a holding clip (1) and a fixing pin (2). The holding clip (1) is formed in an essentially flat and rectangular shape from a steel sheet and, on one side, has pairs of mutually similar spring prongs (11, 12) at the corner regions. As can be seen from FIG. 1, the spring prongs (11, 12) reach into the hollow internal cross-section of the decorative cover (5) and press the decorative cover (5) resiliently, in each case in the vicinity of its narrow sides (5a, 5b), against the bumper (3). By means of this design, the decorative cover (5) can, merely by snapping on, be held on the bumper (3) in such a way that t he holding clip (1) and the fixing pin (2) are covered in a manner completely hidden from sight and that the possible formation of a gap between the decorative cover (5) and the bumper (3) due to bending up of those regions of the decorative cover which are furthest away from the fixing pin (2), namely the narrow sides (5a and 5b), is prevented in an effective manner.

An elongate hole (7), the longitudinal axis (13) of which simultaneously forms a longitudinal axis of symmetry of the holding clip (1), is made in a base surface (14) of the holding clip (1)>The fixing pin (2) is inserted into the elongate hole (7), being held at the end by a head (9) which projects beyond the width of the elongate hole (7). At the same time, the fixing pin (2) is arranged on the holding clip (1) in a manner substantially secure against loss since a central web (8), bent round parallel to the base surface (14) of the clip (1) partially covers the region above the elongate hole (7). In conjunction with the base surface (14), the web (8) forms a guide slot (15) for the head (9), to the greatest possible extent preventing the fixing pin (2) from falling out unintentionally. The web (8) overlaps the elongate hole (7) to such an extent that the fixing pin (2) can only be removed from the clip (1) in the position indicated in FIG. 2 by the reference number (9') since, in this position (9'), the head (9) of the pin (2) is no longer covered by the web (8).

The two positions (9, 9') of the fixing pin head which are shown in FIG. 2 simultaneously represent the extreme positions between which the fixing pin (2) is displaceable within the elongate hole (7), relative to the holding clip (8). This relative mobility of the pin (2) and the holding clip (1) permits the mobility of the bumper (3) into a position (3') depicted in chain lines in FIG. 1 and back again without this having an effect on the decorative strip (5). Whereas, as explained above, the holding clip (i) is mounted firmly in the decorative cover (5), the fixing pin (2) is passed through an accurately fitting opening (4) in the bumper (3) and secured at its end opposite the head (9) by a spring clamping element (6) which is clipped into a corresponding recess (16) of the pin (2). The elongate hole (7) extends in the direction of the yielding movement of the bumper (3) into position (3') and vice versa, while the opening (4) is arranged perpendicular thereto. The spring clamping element (6) presses the head (9) of the pin (2) and hence the holding clip (1) with the decorative cover (5) resiliently against the bumper (3).

Small impact forces cause an elastic yielding movement of the bumper (3) in the direction of the other extreme position (3'), taking the fixing pin (2) along with it. The elongate hole (7) extending in this direction allows this yielding movement without the holding clip (1) and hence the decorative strip (5), being taken along to achieve this. In the case of a flexurally more rigid decorative cover (5), such a take-along movement is thus prevented that would otherwise inevitably lead to a damaging permanent deformation. With the device shown, it is thus possible for the decorative cover to be held simply by pushing on and, at the same time, for the bumper (3) to be moved elastically relative to the decorative cover (5).

By their very nature, wear phenomena occurring due to such yielding movements are to be expected primarily on parts which rest against one another and move relative to one another. In the present case, these are the head (9) of the pin (2) and the rim of the elongate hole in the base surface (14) of the holding clip (1). As is evident, this wear only affects inexpensive small components which are easy to install and remove. In contrast, no significant wear phenomena, of which there would be a real risk if the elongate hole were provided in the bumper, occur either on the bumper (3) or on the decorative cover (5) due to the accurately fitting opening (4) and the fixed position of the holding clip (1) in the decorative cover (5).

The arrangement has the further advantage that, although a permanent deformation of the bumper (3) can occur if the bumper (3) is subjected to further force even after reaching the position (3') defined by the elongate hole (7), no such deformation of the decorative cover (5) can in general occur; for, in this process, the flexurally less rigid holding clip (1) will deform first of all, before permanent damage to the flexurally more rigid decorative cover (5) occurs, with the result that damage is to be expected only in the case of even higher impact forces.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for holding a decorative cover on a bumper of a vehicle, which comprises a holding clip and a fixing pin, wherein the holding clip has an elongate hole, wherein the fixing pin is held movably in the elongate hole, wherein the fixing pin is held movably in the elongate hole of the holding clip by a head at a pin end, and wherein said fixing pin extends through an opening extending essentially perpendicular to the elongate hole in the bumper, wherein the holding clip has a web which extends in an approximately plane-parallel fashion above the elongate hole, said web at least partially covering the elongate hole and, together with a base surface of the holding clip which contains the elongate hole, forms a motion slot for the head of the fixing pin.

2. Device according to claim 1, wherein the fixing pin is secured at its end facing away from the pin head by a spring clamping element.

3. Device according to claim 1, wherein the holding clip has corner regions and a spring prong formed at each corner region, which has spring prongs press the decorative cover resiliently against the bumper.

4. Device according to claim 2, wherein the holding clip has corner regions and a spring prong formed at each corner regions, which spring prong presses the decorative cover resiliently against the bumper.

5. Device according to claim 1, wherein the holding clip is shaped from a steel sheet and formed symmetrically to the longitudinal axis of the elongate hole.

6. Device according to claim 4, wherein the holding clip is shaped from a steel sheet and formed symmetrically to the longitudinal axis of the elongate hole.

7. Device according to claim 1, wherein the holding clip rests on the bumper, is completely surrounded by the decorative cover and presses the decorative cover in the vicinity of opposite sides against the bumper.

8. Device according to claim 7, wherein the holding clip is shaped from a steel sheet and formed symmetrically to the longitudinal axis of the elongate hole.

9. Device according to claim 1, wherein the holding clip has spring prongs which resiliently press the decorative cover against the bumper.

* * * * *